Patented Nov. 25, 1941

2,263,764

UNITED STATES PATENT OFFICE 2,263,764

PROFILER CONTROL FOR DIE SINKING MACHINES

Robert S. Elberty, Jr., Waynesboro, Pa., assignor to Westinghouse Electric & Manufacturing Company, East Pittsburgh, Pa., a corporation of Pennsylvania Application March 9, 1938, Serial No. 194,805

10 Claims. (Cl. 90—13.5)

My invention relates, generally, to metal working tools and, more particularly, to a profiler control for die sinking machines.

In the usual operation of a die sinking machine, the cutting tool moves alternately in a horizontal and a vertical direction, the extent of each movement depending upon the degree of slope of the guide pattern which cooperates with a tracing mechanism to govern the feed movement of the cutting tool. It is apparent that each cut taken by a tool so controlled will be made up of a series of ridges and the ridges will have to be very small to result in a surface even approximating a smooth finished surface.

The object of my invention is to provide a control for a profiler for a die sinking machine which shall function to increase the cutting speed and, therefore, the production of the machine, and improve the quality of the surface produced by the machine.

Another object of the invention is to provide a control for a die sinking machine profiler which shall function to cause the cutting tool to move in the direction of the contour of the guide pattern instead of in a series of horizontal and vertical movements which are the horizontal and vertical components of the contour of the guide pattern.

Figure 1:
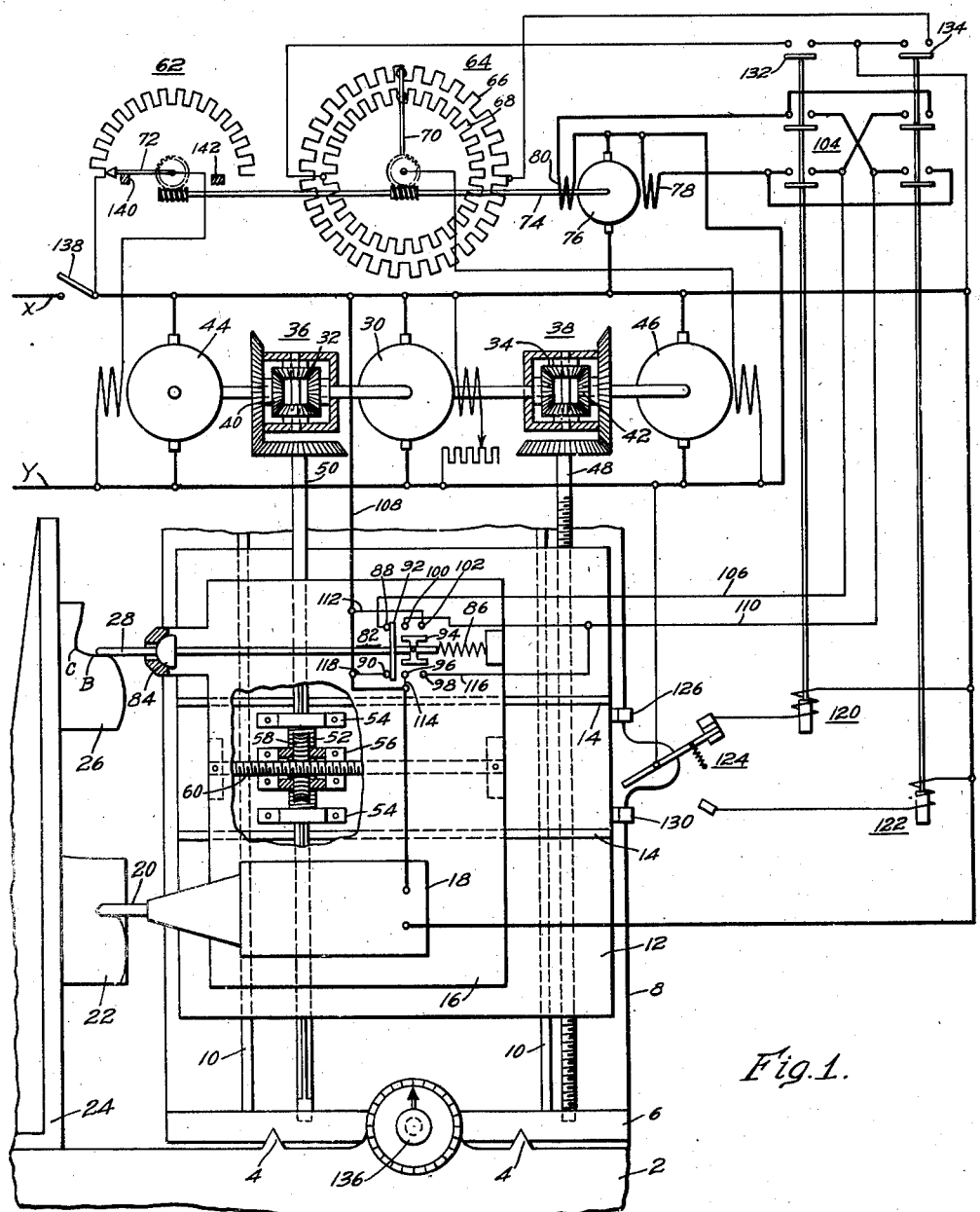
Figure 2:
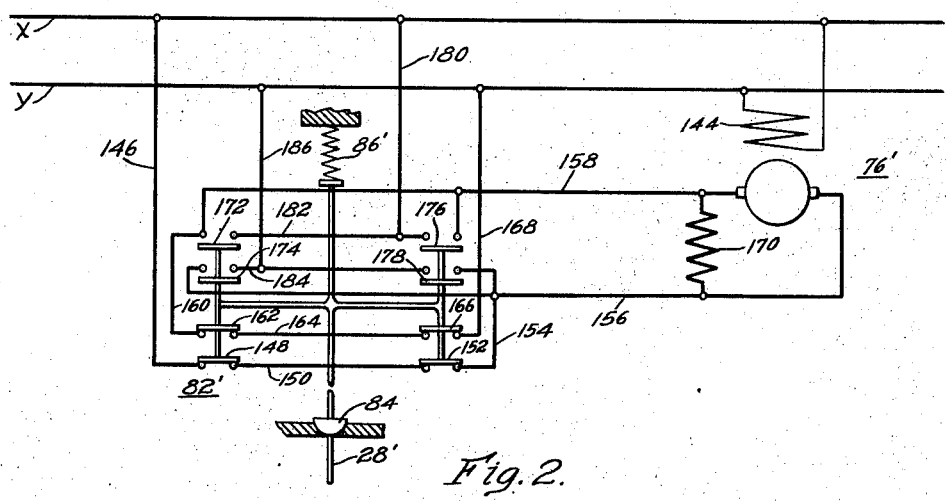
Figure 3:
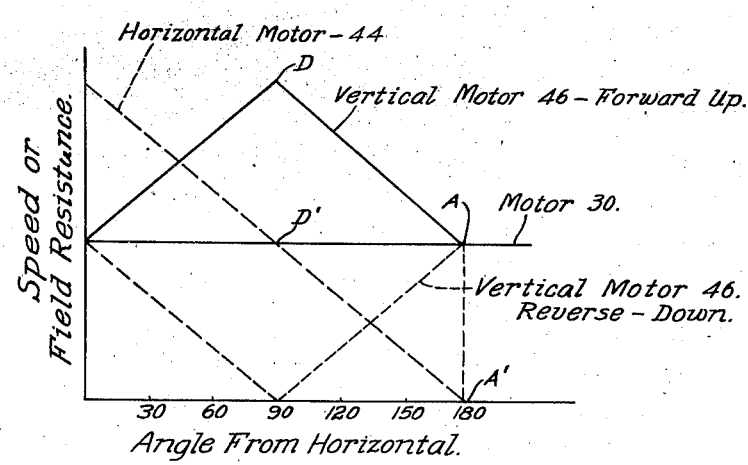

These and other objects and advantages of the invention will be apparent from the following detailed description taken in connection with the accompanying drawings, in which Figure 1 is a diagrammatic illustration of a die sinking machine with the profiler control of the preferred embodiment of my invention applied thereto;

Fig. 2 is a diagrammatic illustration of a modification of the circuit control means controlled by the tracer for governing the direction of rotation of the rheostat motor in which dynamic braking is employed to cause the rheostat motor to stop quickly at its adjusted position; and, Fig. 3 is a graph showing the relations of the speeds of the constant speed differential motor and the horizontal and vertical control differential motors at the different angles of slope of the guide pattern.

In carrying out my invention, I provide a continuously acting profiling tool mounted for horizontal and vertical movement and provide a tracing mechanism mounted for movement with the profiling tool to cooperate with a guide pattern. The contact relation of the tracing mechanism with the guide pattern, depending upon the slope of the guide pattern engaged by the tracing mechanism, governs the speed relations of two motors which drive sun gears of two differential mechanisms whose other sun gears are continuously driven at a constant speed. The differential speed produced in one of these differential mechanisms governs the horizontal movement of the profiling tool and tracing mechanism and the differential speed of the other differential mechanism governs the vertical movement thereof. Since these horizontal and vertical movements are applied simultaneously to the profiler, the direction of movement of the profiler will be the resultant of the horizontal and vertical speeds and will depend upon the relative values of these speeds. Provision is also made for manually setting the profiler for each cut and for reversing the direction of cut after each cut has been made.

Referring now to the drawings, the base plate 2 of the die sinking machine is provided with guides 4 which cooperate with guideways in a movable plate 6 having an upstanding bracket member 8. The bracket member 8 is provided with guides 10 which cooperate with slideways in a plate member 12 to permit vertical sliding movement of plate member 12 on bracket member 8. Plate member 12 is provided with guides 14 which cooperate with slideways in plate member 16 to permit horizontal sliding movement of plate member 16 on plate member 12.

A continuously driven motor 18 driving the profiling tool, or cutting tool, 20 is mounted upon the plate 16. A workpiece 22 is mounted upon a stationary upright bracket 24 in a position to be worked upon by the profiling tool 20. A guide pattern 26 is also mounted upon the bracket 24 and a tracing mechanism 28 is mounted upon plate 16 for cooperation with the guide pattern 26.

A continuously driven motor 30 is provided for actuating the sun gears 32 and 34 of differential mechanisms 36 and 38, respectively. The other sun gears 40 and 42 of differential mechanisms 36 and 38 are driven by motors 44 and 46, respectively. The differential movement between motors 30 and 46 is transmitted through the differential mechanism 38 to the shaft 48 which has screw engagement with the plate 12 to provide vertical movement of the plate 12 on the bracket 8. The differential movement between motors 30 and 44 is transmitted through the differential mechanism 36 to a shaft 50 which may be substantially polygonal in cross section and extends through a worm 52 which has an internal cross section which will permit longitudinal sliding movement of worm 52 on shaft 50 and will also permit shaft 50 to rotate worm 52. Endwise movement of worm 52 is prevented by brackets 54 which are secured to the plate 12. Block member 56 is mounted upon plate 12 and supports a worm gear 58 in cooperative relation with the worm 52. A screw member 60 is secured to horizontally movable plate 16 and cooperates with internal threads on the worm gear 58 so as to cause horizontal movement of the plate 16 when motion is transmitted from the differential mechanism 36 through shaft 50, worm 52 and worm gear 58. Thus it is seen that the differential movement between motors 30 and 44 produce horizontal movement of the cutting tool 20 and the tracer mechanism 28, and that the differential movement between motor 30 and motor 46 causes vertical movement of the cutting tool 20 and the tracing mechanism 28.

The motor 44 has connected in its field circuit a rheostat 62 which has such a range of resistance that when the rheostat is varied from one extreme of its range to another, the motor 44 will be caused to vary its speed from a maximum speed above the speed of the motor 30 to a minimum speed below the speed of the motor 30, the differentiation between the speed of the motor 30 and the maximum and minimum speeds of motor 44 being substantially equal. Thus it will be seen that the differential between the speeds of the motors 30 and 44, as the speed or motor 44 is varied between its extreme maximum and minimum limits, will produce a horizontal movement of the cutting tool 20 and the tracer 28 from a maximum speed of movement in one direction to a maximum speed of movement in the opposite direction.

A rheostat 64 comprising circular resistance elements 66 and 68 is provided, the resistance elements 66 and 68 being selectively connectable in circuit with the field circuit of the motor 46. The design of the rheostats 62 and 64 may be such as to produce any desired relation between the resistances of the two rheostats at any position of the contact arms of the rheostats. The relation of the contact arm 70 with the resistance element 66 is such that as the contact arm 70 moves clockwise through an arc of 180°, the resistance in the field of motor 46 will be varied from a medium resistance which is the resistance required to produce a speed of motor 46 equal to the speed of motor 44 through a minimum resistance which will cause the speed of motor 46 to be less than that of motor 30 by an amount substantially equal to the difference between the maximum speed of motor 44 and the speed of motor 30, and to then increase to a medium resistance such as will increase the speed of motor 46 to a speed equal to the speed of motor 30.

The resistance element 68 is connected opposite to that of resistance element 66 so that within the 180° range of movement of the contact arm 70, the resistance of resistance element 68 will vary from a medium resistance, which will produce a speed of motor 46 equal to the speed of motor 30, through a maximum resistance which will cause the speed of motor 46 to be greater than the speed of motor 30 by an amount substantially equal to the difference between the maximum speed of motor 46 and the speed of motor 30, and then to the medium resistance which will again decrease the speed of motor 46 to make it equal to the speed of motor 30. The contact arm 70 of rheostat 64 and the contact arm 72 of rheostat 62 are connected to be actuated by common shaft 74 through an arc of 180° which is the extreme range of movement of the contact arms to produce a desired extreme range of variation of the rheostat resistances. Thus it will be seen that the relative speeds of the motors 44 and 46 are simultaneously varied by the rotation of the shaft 74 and by the rotation of this shaft 74 the horizontal and vertical components of the movement of the cutting tool 20 and the tracing mechanism 28 may be varied.

The shaft 74 is connected to reversible motor 76 which drives the shaft in a forward or reverse direction, depending upon which of its field coils 78 and 80 is energized. The selection of the energization of field coils 78 and 80 of motor 76 and, therefore, the direction of rotation of motor 76 is accomplished by means of the switch mechanism 82, which is controlled by the tracing mechanism 28. The rod of the tracing mechanism 28 extends slidably through the ball and socket joint 84 and is biased to the position in which it is shown in Fig. 1 by a spring member 86. In this position it will be seen that contact elements 88 and 90 are bridged by the movable contact element 92. The movable contact element 94 is disposed to bridge contact elements 96 and 98 or contact elements 100 and 102 when the arm of the tracer mechanism is deflected laterally. It will be further seen that longitudinal deflection of the arm of the tracer mechanism 28 will cause contact element 92 to disengage contact elements 88 and 90 and if this longitudinal deflection is sufficient the contact elements 96 and 100 will be engaged thereby.

A circuit from the supply conductor X to conductor 106 comprising conductor 108, conductor 118, contact element 90, movable contact element 92 and contact element 88 is completed when the movable contact element 92 is in engagement with contact elements 88 and 90. When the movable contact element 94 is in engagement with contact elements 100 and 102, a circuit is established between supply conductor X and conductor 110 comprising conductor 108, conductor 112, contact element 102, movable contact element 94 and contact element 100. When contact element 94 is in engagement with contact elements 96 and 98, a circuit is completed between conductor 110 and supply conductor X comprising conductor 108, conductor 114, contact element 96, movable contact element 94, contact element 98 and conductor 116. A circuit is completed between conductor 110 and supply conductor X when the movable contact element 92 is in contact relation with contact elements 96 and 100 comprising conductor 108, conductor 114, contact element 96, contact element 92 and contact element 100.

Conductors 106 and 110 are connected to the reversing switch 104 which, in turn, is connected to the field coils 78 and 80 of the motor 76, and the motor 76 is energized to run in one direction or the other depending upon which of the conductors 106 and 110 are connected by the switching device 82 to the supply conductor X and depending upon the position of the reversing switch 104. The reversing switch 104 is selectively actuated by relays 120 and 122 which, in turn, are selectively energized by the directional switch device 124 which is actuated by the adjustable lugs 126 and 130 mounted on the vertically slidable plate 12 to reverse the direction of the vertical movement of plate 12 when the plate has reached either of its predetermined limits of vertical movement. Relays 120 and 122 also govern the position of contact elements 132 and 134 to select the resistance elements 68 and 66, respectively, of the rheostat 64.

A manual control means, of which operating knob 136 is a part, is provided for positioning the plate 6 on the base plate 2 in a direction normal to the plane of movement of the cutting tool 20 by the automatic mechanism after each cut is completed by the tool 20. Any suitable mechanism may be operated by the knob 136 for providing relative motion between the plate 6 and base plate 2 in a direction normal to the plane of the paper.

In the operation of the device it may be assumed that the machine has been deenergized by moving the contact element 138 to open circuit position. It will be seen that the tracing element 28 and the cutting tool 20 are in corresponding positions on the guide pattern 26 and the work piece 22, respectively, and that the cutting tool has progressed from the lower edge of the work piece 22 to the position shown cutting the contour in the work piece 22 corresponding to the contour of the pattern 26 traversed by the tracing mechanism 28. At the time that the machine was deenergized it will be seen that horizontal motion only was being transmitted to the cutting tool 20 since the slope of the guide pattern where it is engaged by the tracing device 28 has only a horizontal component and since the contact arm 72 of the rheostat 62 has been moved to the extreme position on the rheostat representing the minimum resistance in the field circuit of the horizontal motion control motor 44. The vertical motion of the plate 16 was upward as seen by the position of the selector switch 124 and the relay 120 being energized, contact element 132 was in closed circuit position and resistance element 68 was connected in circuit with the field coil of vertical movement control motor 46. At this time the contact arm 70 of rheostat 64 was in a position which would cause motor 46 to run at a speed equal to the speed of motor 30, thus giving no vertical component of movement.

The conditions obtaining at this time are represented by the point A on the curve for the forward motion of vertical motion control motor 46 and the curve of motor 30 and the point A' on the curve of horizontal motor 44 in the graph of Fig. 3.

If now the contact element 138 is moved to the closed circuit position, motors 18, 30, 44, 46 and 76 will be energized, relay 120 will be energized to close its contact element 132 and its part of the reversing switch 104 to properly select the direction of operation of the motor 76 and to select the resistance element 68 for operation in the field circuit of the motor 46. The motor 76, however, though its field circuit is closed by the movable contact element 92 of control switch 82, will not be able to rotate since the stop member 140 will be engaged by the contact arm 72 of rheostat 62 and will prevent the rheostat arm 72 from moving further in the direction of decreasing resistance of the rheostat 62. Thus the cutting tool 20 and the tracing mechanism 28 will continue in horizontal movement to the left until the change in slope of the contour of the guide pattern 26 at approximately the point B deflects the tracing mechanism to move the movable contact element 92 out of engagement with contact element 88 and the movable contact element 94 into engagement with contact elements 96 and 98. The circuit of the field coil 78 of motor 76 having been broken by the movement of contact element 92 out of engagement with contact element 88, the field of the motor 76 will no longer be energized in such a direction as to cause it to tend to move the contact arms 70 and 72 of the rheostats 64 and 62 in the counter-clockwise direction. The contact element 94, however, having completed the circuit through conductor 110 to the field coil 80 of motor 76 by engaging the contact elements 96 and 98 will energize the field coil 80 of motor 76 and will cause the motor to run in such a direction as to move the contact arms 70 and 72 in the clockwise direction. The movement of the contact arms 70 and 72 of the rheostats 64 and 62 will so alter the field currents of the motors 46 and 44 as to change their relative speeds and thus decrease the rate of horizontal feed of the cutting tool 20 and the tracing mechanism 28 and increase the upward vertical feed of these elements. The motor 76 will operate to change the resistance of rheostats 64 and 62 until its circuit is opened by the movement of contact element 94 out of engagement with contact elements 96 and 98 and this condition will obtain only when the resultant of the components of horizontal and vertical movement imparted to the cutting tool 20 and the tracing mechanism 28 through the differential mechanisms has a direction which is the same as the direction of slope at the point B on the guide pattern 26.

As another example of the operation of the device, it may be assumed that the engagement of the tracing device 28 at the point C on the pattern has moved the tracing device 28 longitudinally to cause the contact element 92 to bridge the contact elements 96 and 100. This will energize the motor 76 and will cause it to move the contact arms 70 and 72 clockwise until the contact arm 72 has moved clockwise through an arc of 90° and the contact arm 70 has moved clockwise through an arc of 90°. At this time the resistance in the field circuit of motor 44 and the speed of the motor 44 will correspond to the point D' on the horizontal motor curve in the graph of Fig. 3 and the resistance in the field circuit of motor 46 and the speed of motor 46 will have increased to the point corresponding to the point marked D on the graph of Fig. 3. It will be seen that the cutting tool 20 and the tracing device 28 will have only upward vertical motion at this time since the speed of the horizontal motion control motor 44 is equal to that of the motor 30 and the speed of the vertical motion control motor 46 is a maximum amount above the speed of motor 30. When this condition has been established, the contact engagement of the tracing element 28 with the guide pattern 26 will be such as to hold the contact element 92 between the pairs of contact elements 88 and 90, and 96 and 100, and the contact element 94 in the position shown in Fig. 1. Motor 76 will then cease to rotate and the vertical motion will be imparted to the tracing mechanism 28 and the cutting tool 20 until another change in the slope of the guide pattern 26 so deflects the tracing mechanism 28 as to cause it to readjust the relative speeds of the motors 44 and 46 to produce the resultant direction of motion of the cutting tool 20 and the tracing mechanism 28 conforming with the direction of slope of the guide pattern 26.

When the tool has moved vertically a predetermined amount, the lug 130 will engage the switching device 124 to cause it to deenergize relay 120 and to energize relay 122, thus selecting the resistance element 66 of rheostat 64 to be connected in circuit with the field coil of motor 46 and reversing the field coils 78 and 80 of motor 76 with respect to the control circuits 106 and 110. This will cause the vertical motion of the cutting tool 20 to be downward since the speed of the vertical motor and its field resistance will vary according to the reverse curve for the vertical motor 46 in the graph of Fig. 3. The reversal of the connections to the field coils 78 and 80 of motor 76 will permit the motor 76 to rotate in the proper direction to vary the resistances of rheostats 62 and 64 so that the relative speeds of motors 44 and 46 may be varied to produce the proper components of vertical and horizontal motion for the cutting tool 20 in the downward direction of travel.

When the vertical travel of the cutting tool 20 has been reversed, the manual control knob 136 may be actuated to shift the plate 16 to move the cutting tool 20 so that its plane of motion will be shifted to permit it to take another cut as it travels downward. It is understood that this shifting of the plate 16 may also be done automatically by means common in this art.

In Fig. 2, I have shown another embodiment of a control switch to be actuated by the deflection of a tracer mechanism. Referring to Fig. 2, elements 28', 86' and 84' analogous to elements 28, 86 and 84 have been provided. The tracing element 28' governs the switching device 82' to control the direction of flow of current from the supply conductors X and Y to the rheostat motor 76', which has its field coil 144 permanently connected to the supply conductors X and Y. The position of the switch shown in Fig. 2 corresponds to the position of the switch 82 in the device of Fig. 1 and in this position a circuit will be completed to cause the motor 76' to rotate in one direction. This circuit extends from conductor X through conductor 146, contact element 148, conductor 150, contact element 152, conductor 154, conductor 156, the armature of motor 76', conductor 158, conductor 160, contact element 162, conductor 164, contact element 166 and conductor 168 to the conductor Y of the supply source. If now the contact relation of the tracing element 28' with the guide pattern should be such as to cause longitudinal movement of the tracing element 28', contact elements 148, 162, 152 and 166 would be moved to open circuit position and the armature of motor 76' would be deenergized. To provide dynamic braking of the motor 76' to bring it to rest very quickly after it is so deenergized, a resistance 170 is connected across the armature to absorb the power in the armature when it is deenergized and thus to bring it to a quick stop. If now the contour of the guide pattern should be such as to deflect the tracing mechanism laterally, either contact elements 172 and 174 or contact elements 176 and 178 would be moved to closed circuit position to energize the armature of motor 76 with the opposite polarity to cause it to rotate in the opposite direction. If contact elements 172 and 174 were moved to closed circuit position by the deflection of the tracing mechanism 28' a circuit would be established through the armature of motor 76' extending from conductor X of the source of supply, through conductor 180, conductor 182, contact element 172, conductor 158, the armature of motor 76', conductor 156, contact element 174, conductor 184 and conductor 186 to the other conductor Y of the source of supply.

Thus I have provided a control device for the rheostat motor which will selectively control the direction of rotation of the rheostat motor in response to the tracing mechanism and will provide dynamic braking for the rheostat motor when it is deenergized by the control mechanism.

It will be seen that I have provided a control for the profiler or cutting tool of a die sinking machine which will provide simultaneously components of horizontal and vertical motions of the cutting tool corresponding to the horizontal and vertical components of the slope of the guide pattern at the point where it is engaged by the tracing mechanism of the machine so that the direction of motion of the cutting tool will always be in the direction of the slope of the guide pattern, thereby to produce an accurate and smooth contour and to increase the production of the machine.

In compliance with the requirements of the patent statutes, I have shown and described herein the preferred embodiments of my invention. It is understood, however, that the invention is not limited to the precise construction shown and described, but is capable of modification by one skilled in the art, the embodiments herein shown being merely illustrative of the principles of my invention.

I claim as my invention:

1. In a system for controlling the movement of a metal working tool, a pair of differential gear trains each having two sun gears and a planetary gear, means for driving one of the sun gears of each of said gear trains at a substantially constant speed, separate motors for driving the other sun gear of each of said gear trains, means for simultaneously varying the speed of one of said motors so as to produce a range of speeds of the sun gear driven by said one motor from a speed substantially above the speed of the other sun gear of the one gear train to the speed of the said other sun gear and from the speed of said other sun gear to a speed substantially below the speed of said other sun gear, while varying the speed of the other of said motors so as to produce a range of speeds of the sun gear driven by said other motor from the speed of the other sun gear of the other gear train to a speed substantially different from the speed of said other sun gear and from the speed substantially different from the speed of said other sun gear to the speed of said other sun gear, means whereby one of said planetary gears imparts vertical motion to the tool, means whereby the other of said planetary gears imparts horizontal motion to the tool, and means for selectively governing the action of said means for varying the speeds of said motors to thereby selectively vary the direction of movement of the tool.

2. In a system for controlling the movement of a metal working tool, a pair of differential gear trains each having two sun gears and a planetary gear, means for driving one of the sun gears of each of said gear trains at a substantially constant speed, separate motors for driving the other sun gear of each of said gear trains, means for simultaneously varying the speed of one of said motors so as to produce a range of speeds of the sun gear driven by said one motor from a speed substantially above the speed of the other sun gear of the one gear train to the speed of the said other sun gear and from the speed of said other sun gear to a speed substantially below the speed of said other sun gear, while varying the speed of the other of said motors so as to produce a range of speeds of the sun gear driven by said other motor from the speed of the other sun gear of the other gear train to a speed substantially different from the speed of said other sun gear and from the speed substantially different from the speed of said other sun gear to the speed of said other sun gear, means whereby one of said planetary gears imparts vertical motion to the tool, means whereby the other of said planetary gears imparts horizontal motion to the tool, and means comprising a tracer mechanism cooperating with a guide pattern for selectively controlling the action of said means for simultaneously varying the speeds of said motors to thereby selectively vary the direction of movement of the tool in accordance with the direction of the slope of that part of the guide pattern engaged by said tracer mechanism.

3. In a system for controlling the movement of a metal working tool, a pair of differential gear trains each having two sun gears and a planetary gear, means for driving one of the sun gears of each of said gear trains at a substantially constant speed, separate motors for driving the other sun gear of each of said gear trains, means for simultaneously varying the speed of one of said motors so as to produce a range of speeds of the sun gear driven by said one motor from a speed substantially above the speed of the other sun gear of the one gear train to the speed of the said other sun gear and from the speed of said other sun gear to a speed substantially below the speed of said other sun gear, while varying the speed of the other of said motors so as to produce a range of speeds of the sun gear driven by said other motor from the speed of the other sun gear of the other gear train to a speed substantially different from the speed of said other sun gear and from the speed substantially different from the speed of said other sun gear to the speed of said other sun gear, means whereby one of said planetary gears imparts vertical motion to the tool, means whereby the other of said planetary gears imparts horizontal motion to the tool, said means for simultaneously varying the speeds of said sun gear driving motors comprising rheostats in circuit with the field windings of said motors, means for simultaneously actuating said rheostats so as to produce the aforesaid ranges of sun gear speeds, a tracing mechanism mounted for movement with the tool and cooperating with a guide pattern, and means whereby deviation of said tracing mechanism from predetermined contact relation with the guide pattern causes selective directional actuation of said rheostat actuating means.

4. In a system for controlling the movement of a metal working tool, a pair of differential gear trains each having two sun gears and a planetary gear, means for driving one of the sun gears of each of said gear trains at a substantially constant speed, separate motors for driving the other sun gear of each of said gear trains, means for simultaneously varying the speed of one of said motors so as to produce a range of speeds of the sun gear driven by said one motor from a speed substantially above the speed of the other sun gear of the one gear train to the speed of the said other sun gear and from the speed of said other sun gear to a speed substantially below the speed of said other sun gear, while varying the speed of the other of said motors so as to produce a range of speeds of the sun gear driven by said other motor from the speed of the other sun gear of the other gear train to a speed substantially different from the speed of said other sun gear and from the speed substantially different from the speed of said other sun gear to the speed of said other sun gear, means whereby one of said planetary gears imparts vertical motion to the tool, means whereby the other of said planetary gears imparts horizontal motion to the tool, means for selectively governing the action of said means for varying the speeds of said motors to thereby selectively vary the direction of movement of the tool, and means whereby said different speed is a speed higher than said speed of said sun gear during a predetermined range of motion of the tool and lower than said speed of said sun gear during a predetermined range of motion of the tool.

5. In a system for controlling the movement of a metal working tool, a pair of differential gear trains each having two sun gears and a planetary gear, means for driving one of the sun gears of each of said gear trains at a substantially constant speed, separate motors for driving the other sun gear of each of said gear trains, means for simultaneously varying the speed of one of said motors so as to produce a range of speeds of the sun gear driven by said one motor from a speed substantially above the speed of the other sun gear of the one gear train to the speed of the said other sun gear and from the speed of said other sun gear to a speed substantially below the speed of said other sun gear, while varying the speed of the other of said motors so as to produce a range of speeds of the sun gear driven by said other motor from the speed of the other sun gear of the other gear train to a speed substantially different from the speed of said other sun gear and from the speed substantially different from the speed of said other sun gear to the speed of said other sun gear, means whereby one of said planetary gears imparts vertical motion to the tool, means whereby the other of said planetary gears imparts horizontal motion to the tool, said means for simultaneously varying the speeds of said sun gear driving motors comprising rheostats in circuit with the field windings of said motors, a reversible motor for simultaneously actuating said rheostats in such a manner as to produce the aforesaid ranges of sun gear speeds, a tracing mechanism mounted for movement with the tool and cooperating with a guide pattern, and means governed by predetermined deviations of said tracing mechanism from normal contact relation with the guide pattern for causing the rotation of, and selecting the direction of rotation of said rheostat motor.

6. In a system for controlling the movement of a metal working tool, a pair of differential gear trains each having two sun gears and a planetary gear, means for driving one of the sun gears of each of said gear trains at a substantially constant speed, separate motors for driving the other sun gear of each of said gear trains, means for simultaneously varying the speed of one of said motors so as to produce a range of speeds of the sun gear driven by said one motor from a speed substantially above the speed of the other sun gear of the one gear train to the speed of the said other sun gear and from the speed of said other sun gear to a speed substantially below the speed of said other sun gear, while varying the speed of the other of said motors so as to produce a range of speeds of the sun gear driven by said other motor from the speed of the other sun gear of the other gear train to a speed substantially different from the speed of said other sun gear and from the speed substantially different from the speed of said other sun gear to the speed of said other sun gear, means whereby one of said planetary gears imparts vertical motion to the tool, means whereby the other of said planetary gears imparts horizontal motion to the tool, said means for simultaneously varying the speeds of said sun gear driving motors comprising rheostats in circuit with the field windings of said motor, a reversible motor for simultaneously actuating said rheostats in such a manner as to produce the aforesaid ranges of sun gear speeds, a tracing mechanism mounted for movement with the tool and cooperating with a guide pattern, and means governed by predetermined deviations of said tracing mechanism from normal contact relation with the guide pattern for causing the rotation of and selecting the direction of rotation of said rheostat motor, said motor having dynamic braking means effective only while said motor is not energized for rotation.

7. In a control system for a metal working tool, a guide pattern having a contour which it is desired to have the tool produce on a work piece, a tracing mechanism cooperating with said guide pattern, means providing a common mounting for the tool and said tracing mechanism, means for imparting to said mounting means motions in two different directions simultaneously, and means controlled by said tracing mechanism for varying the relative speeds of the motions in said two directions in accordance with the components, in said two directions, of the slope of said guide pattern, said tracing mechanism comprising a stem element having a contacting portion cooperating with said guide pattern, means mounting said stem for forward and reverse longitudinal movement toward and away from said guide pattern, means mounting said stem for pivotal movement in the plane of its action, means biasing said stem in said forward direction of longitudinal movement and said means controlled by said tracer mechanism comprising two control circuits, means whereby predetermined forward movement of said stem energizes one of said circuits and means whereby predetermined reverse movement and/or predetermined pivotal movement of said stem energizes the other of said circuits.

8. In a control system for metal working tool positioning motors controlled by a tracing member and a guide pattern, a variable resistor associated with each of the motors for controlling the speed of their associated motors, a reversible drive motor for said variable resistors, and means whereby deviation of the tracing member from a predetermined control relation with the surface of the guide pattern so controls the direction of rotation of said variable resistor drive motor as to produce positioning motor speeds proportional to the components, in two directions, of the slope of the guide pattern at the position at which the tracing member engages the guide pattern.

9. In a control system for metal working tool positioning motors controlled by a tracing member and a guide pattern, a variable resistor connected to control the speed of each of the motors, a reversible motor connected to actuate said resistors simultaneously said resistors being so arranged as to have their relative resistance values varied by actuation by said reversible motor, and means whereby deviation of the tracing member from a predetermined contact relation with the surface of the guide pattern so controls the direction of rotation of said reversible motor as to vary the positioning motor speeds in accordance with the variations of the relative values of the components, in two directions, of the slope of the guide pattern.

10. In a control system for metal working tool positioning motors controlled by a tracing member and a guide pattern, a reversible motor, means controlled by said reversible motor for varying the relative speeds of the positioning motors in accordance with the direction of operation of said reversible motor, and means whereby deviation of the tracing member from a predetermined relation with the guide pattern so controls the direction of rotation of said reversible motor as to vary the positioning motor speeds in accordance with the variations of the relative values of the components, in two directions, of the slope of the guide pattern.

ROBERT S. ELBERTY, JR.